United States Patent [19]

Asbeck et al.

[11] Patent Number: 5,210,242
[45] Date of Patent: May 11, 1993

[54] PROCESS FOR SOAP SPLITTING USING A HIGH TEMPERATURE TREATMENT

[75] Inventors: Lutz S. Asbeck; Walter W. Link, both of Delmenhorst, Fed. Rep. of Germany

[73] Assignee: Van den Bergh Foods Co., Division of Conopco, Inc., Lisle, Ill.

[21] Appl. No.: 546,158

[22] Filed: Jun. 28, 1990

[30] Foreign Application Priority Data

Jul. 3, 1989 [GB] United Kingdom ............... 8915263

[51] Int. Cl.$^5$ ............................................. C11B 13/02
[52] U.S. Cl. .................................................. 554/188
[58] Field of Search ............................ 260/415, 412.5; 554/188

[56] References Cited

U.S. PATENT DOCUMENTS 3,428,660 2/1969 Morren .............................. 260/412.5
3,787,460 1/1974 Gadefaix et al. ..................... 260/418
4,118,407 10/1978 Red et al. ........................... 260/412.5
4,361,517 11/1982 Duff et al. .......................... 260/412.5
4,671,902 6/1987 Brister ............................... 260/412.5

FOREIGN PATENT DOCUMENTS 1307862 2/1973 United Kingdom .

Primary Examiner—José G. Dees
Assistant Examiner—Deborah D. Carr
Attorney, Agent, or Firm—Rimma Mitelman

[57] ABSTRACT

The invention relates to a process for splitting soapstock, comprising the steps of mixing the soapstock with a soap splitting acid, and of separating the acid water phase formed from the oil phase, characterized in that the mixture of the soapstock and the soap splitting agent are subjected to a high temperature treatment at or above 100° C. during a residence time equal to or more than 2 minutes.

8 Claims, No Drawings

PROCESS FOR SOAP SPLITTING USING A HIGH TEMPERATURE TREATMENT

BACKGROUND OF THE INVENTION

The present invention relates to a process for splitting soapstock, comprising the steps of mixing the soapstock with a soap splitting acid, and of separating the acid water phase formed from the oil phase.

Glyceride oils of in particular vegetable origin, such as maize oil, sunflower oil, soybean oil, rapeseed oil, safflower oil, cotton seed oil and the like, are valuable raw materials for the food industries. These oils in crude form are usually obtained from seeds and beans by pressing and/or solvent extraction.

Such crude glyceride oils mainly consist of triglyceride components. However, they generally also contain a significant amount of non-triglyceride components including phosphatides (gums), waxy substances, partial glycerides, free fatty acids, sterolglucosidesand esters thereof, sucrolipids, lipoproteins, colouring materials and small amounts of metals. Depending on the intended use of the oil, many of these impurities have an undesirable effect on the (storage) stability, taste, and colour of later products. It is therefore necessary to refine, i.e. to remove the gums and other components from the crude glyceride oils as much as possible.

In general the first step in the refining of glyceride oils is the so-called degumming step, i.e. the removal of the phosphatides. In a conventional degumming process water is added to the crude gluceride oil to hydrate the phosphatides, which are subsequently removed e.g. by centrifugal separation. Since the resulting degummed oil often still contains unacceptably high levels of 'non-hydratable' phosphatides, this water-degumming step is normally followed by chemical treatments with acid and/or alkali to remove the residual phosphatides and to neutralize the free fatty acids ('alkali-refining'). Subsequently, the soapstock so formed is separated from the neutralized oil by centrifugal separation.

Soapstock containing the afore-mentioned non-triglyceride components and has to be split prior to it's disposal in order to recover the fatty acids contained therein, and to obtain an effluent (acid water) containing low levels of total fatty matter (TFM), that is material soluble in ether.

During the splitting of the soapstock using a soap splitting acid, such as sulphuric acid, at pH 2 and a soap splitting temperature of 95° C., an emulsion may be formed. The emulsion formation occurs especially when splitting maize- or sunflower soapstock.

There are several unit operations available to break the emulsions formed. These unit operations comprise filtration, centrifugation, settling during long time periods and a low pH treatment. All these unit operation are cumbersome, because of the corrosive nature of the emulsion (for instance a pH of 4 or lower), whereas due to the large amount of acid used the effluent may require a pre-treatment before disposal.

NL-A-69 17290 discloses a method and an apparatus for continuously splitting of soapstock formed in the alkali refining of crude glyceride oil, in which an inorganic acid is intensively mixed with steam in a Venturi tube, and subsequently the acid steam mixture is intensively mixed with soapstock in a second Venturi tube. The soapstock had a temperature of 80°-95° C. and was passed through a separation zone comprising a packed bed of filling material.

GB-A-1,307,862 discloses a process for treating a solution comprising soapstock, sulphonate salt and an inorganic salt for the recovery of fatty acid and a sulphonate salt solution therefrom. This mixture is acidified at 80° C. to pH 2,5 using sulphoric acid.

U.S. Pat. No. 4,118,407 discloses a process for recovering free fatty acid from aqueous crude soapstock containing saponifiable fatty material comprising a glyceride oil, comprising a saponification zone in which crude soapstock is mixed with an inorganic base and recycled inorganic salt containing neutralized acid water. The saponified soapstock is passed to a acidulation zone in which it is mixed with an inorganic salt at a temperature of between about 80°-95° C. Finally, a free fatty acid stream is separated in a separation zone and neutralized acid water is recycled to the saponification zone.

U.S. Pat. No. 4,671,902 discloses a method for the preparation of fatty acid products from glyceride oil soapstock, in which the soapstock is acidulated with an aqueous mineral acid, and after separation of an aqueous solution the remaining emulsion of fatty material and sludge is dried to a watter content of less than 5% resulting in a breakage of the emulsion. The acidification is carried out at 80°-95° C., at a pH of 3-4, for at least two hours.

SUMMARY OF THE INVENTION

It has been found that when the mixture of soapstock and soap splitting agent is subjected to a high temperature treatment, the emulsion formation is substantially avoided.

Accordingly, an object of the invention is to provide a process for splitting soapstock, by which the emulsion formation is substantially avoided and accordingly, the acid water phase and oil phase formed are easily separatable from one another. The process of the invention is characterized in that the mixture of the soapstock and the soap splitting acid are subjected to a high temperature treatment at or above 100° C. during a residence time equal to or more than 2 minutes.

Preferably the high temperature treatment is carried out at a temperature of about 100°-150° C. The upper temperature limit is elected such that the pressure is not too far above atmospheric pressure (pressure less than 6 bar).

Generally, a residence time of about 15-60 minutes is sufficient and optimal results are obtained after a residence time of about 20-40 minutes.

Generally, the high temperature treatment is carried out at a pH of about 0.5-4, particularly at a pH near or equal to pH 2.

Preferably, the splitted soapstock is settled at a temperature lower than the temperature of the high temperature treatment for separating the acid oil phase from the acid water phase. Preferably, the settling is carried out after cooling to a temperature of about 50°-95° C. A lower settling temperature is preferred, because at those lower temperatures the phase separation occurs within normally 15 minutes and the decrease of the solubility of the total fatty matter (TFM) in the acid water phase is larger than the increase of the viscosity of water. Finally, settling at the high temperature requires a pressure vessel, cooling of the acid water outlet and high investment costs for the pressure settling vessel and above all severe corrosion problems.

Generally, the high temperature treatment according to the invention leads to significantly lower TFM contents in the acid water phase, generally to TFM contents less than 1,000 ppm.

Preferably, the soapstock originates from non-degummed or water-degummed glyceride oil.

The soap splitting process according to the invention may be used in a continuous process or in a batchwise process.

DETAILED DESCRIPTION OF THE INVENTION

The following examples are given to illustrate the soap splitting process according to the invention, and may not be construed as to limit the invention described herein.

EXAMPLE I

Soapstock originating from non-degummed maize oil heated to a temperature of 95° C. was mixed with concentrated sulphuric acid untill pH 2 was reached. The mixture of soapstock and sulphuric acid was subjected to the high temperature treatment according to the invention, using temperatures indicated in table 1, and allowing a residence time of 2 minutes. The amount of TFM in the acid water phase was compared to the amount present in the acid water phase obtained under prior art soap splitting conditions (temperature 95° C.; residence time 2 minutes).

TABLE 1

| T (°C.) | TFM (*1000 ppm) |
| --- | --- |
| 95 | 44.0 |
| 110 | 11.0 |
| 125 | 3.9 |
| 130 | 1.2 |
| 150 | 0.8 |

EXAMPLE II

Soapstock originating from non-degummed maize oil and non-degummed sunflower oil was split at pH 2 using sulphuric acid, whereafter the splitted soapstock was allowed a residence time of 2 minutes at 95° C. (prior art) or at 150° C. (according to the invention). Settling was carried out at 95° C. for 1 hour.

The TFM contents of the acid water obtained are listed in table 2.

TABLE 2

| Soapstock | TFM content acid water (ppm) after 2 minutes at | |
| --- | --- | --- |
|  | 95° C. | 150° C. |
| maize | 44,000 | 800 |
| sunflower | 12,400 | 420 |

EXAMPLE III

Soapstock originating from non-degummed maize oil was soap splitted at pH 2 using sulphuric acid. Thereafter the splitted soap stock was subjected to the high temperature treatment at 150° C. during various residence times indicated in table 3. Settling was carried out at 95° C. for 1 hour.

The TFM contents of the acid water obtained are also indicated in table 3.

TABLE 3

| residence time (min) | TFM (ppm) |
| --- | --- |
| 2 | 1110 |
| 10 | 290 |
| 30 | 80 |

EXAMPLE IV

Soapstock originating from sunflower oil having a high content of partially unsaturated fatty acids was soap splitted in a continuous process at 95° C. and pH 2. Without the high temperature treatment according to the invention the aqueous phase contained 79,700 ppm TFM, and after the high temperature treatment according to the invention at 130° C. and 150° C. were 750 and 250 ppm TFM, respectively.

EXAMPLE V

Soapstock originating from water-degummed maize oil was subjected to soap splitting using sulphuric acid at 95° C. and pH 2. Without the high temperature treatment according to the invention the aqueous phase comprised 8,040 ppm TFM. After the high temperature treatment according to the invention at 140° C. and a residence time of 20 and 30 minute the TFM content of the acid water phase decreased to 170 and 260 ppm TFM, respectively.

We claim:

1. Process for splitting soapstock, comprising the steps of mixing the soapstock with a soap splitting acid, and of separating the acid water phase formed from the oil phase, characterized in that the mixture of the soapstock and the soap splitting agent are subjected to a high temperature treatment at or above 110° C. during a residence time equal to or more than 2 minutes.

2. Process as claimed in claim 1, wherein the high temperature treatment is carried out at a temperature of about 110°–150° C.

3. Process as claimed in claim 1, wherein the residence time is about 15–60 minutes.

4. Process as claimed in claim 3, wherein the residence time is about 20–40 minutes.

5. Process as claimed in claim 1, wherein the high temperature treatment is carried out at a pH of about 0.5–4.

6. Process as claimed in claim 1, wherein after the high temperature treatment the mixture is cooled to a temperature below about 110° C., and allowed to settle.

7. Process as claimed in claim 6, wherein the mixture is cooled to a temperature of about 50°–95° C.

8. Process as claimed in claim 1, wherein the water phase separated has a total fatty matter (TFM) content of less than 1,000 ppm.

* * * * *